United States Patent
Nakano et al.

(10) Patent No.: US 11,105,757 B2
(45) Date of Patent: Aug. 31, 2021

(54) GAS SENSOR DEVICE (71) Applicant: Hitachi Automotive Systems, Ltd., Hitachinaka (JP)

(72) Inventors: Hiroshi Nakano, Tokyo (JP); Masahiro Matsumoto, Tokyo (JP); Yasuo Onose, Hitachinaka (JP); Hiroaki Hoshika, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 207 days.

(21) Appl. No.: 16/466,349

(22) PCT Filed: Nov. 6, 2017

(86) PCT No.: PCT/JP2017/039862
§ 371 (c)(1),
(2) Date: Jun. 4, 2019

(87) PCT Pub. No.: WO2018/110140
PCT Pub. Date: Jun. 21, 2018

(65) Prior Publication Data
US 2020/0080951 A1 Mar. 12, 2020

(30) Foreign Application Priority Data
Dec. 14, 2016 (JP) .............................. JP2016-242217

(51) Int. Cl.
*G01N 25/18* (2006.01)
*G01F 1/692* (2006.01)
*G01N 27/18* (2006.01)

(52) U.S. Cl.
CPC ............. *G01N 25/18* (2013.01); *G01F 1/692* (2013.01); *G01N 27/18* (2013.01)

(58) Field of Classification Search
CPC ........ G01N 25/18; G01N 25/20; G01N 25/56; G01N 27/18; G01F 1/688; G01F 1/6888; G01F 1/692; G01F 1/696; G01F 1/699
See application file for complete search history.

(56) References Cited

U.S. PATENT DOCUMENTS

2006/0186901 A1   8/2006   Itakura
2011/0154885 A1   6/2011   Nakano

FOREIGN PATENT DOCUMENTS

JP   2006-234576 A   9/2006
JP   2007-315925 A   12/2007
(Continued)

OTHER PUBLICATIONS

International Search Report with English translation and Written Opinion issued in corresponding application No. PCT/JP2017/039862 dated Jan. 30, 2018.

*Primary Examiner* — Benjamin R Schmitt
(74) *Attorney, Agent, or Firm* — Foley & Lardner LLP (57) ABSTRACT

An object of the present invention is to provide a gas sensor device capable of detecting a temporal change with high accuracy and maintaining measurement accuracy over a long period under a temperature environment susceptible to a complicated and wide range of change.
The gas sensor device includes: heat insulating films 8a and 8b formed on a substrate 2; a first heater 3 provided on the heat insulating films 8a and 8b and configured to measure physical quantity of gas; and a reference resistor 4 formed in a resistive layer same as the first heater and formed on the heat insulating films 8a and 8b. The gas sensor device further includes a second heater 5 that simultaneously heats the first heater 3 and the reference resistor 4.

10 Claims, 5 Drawing Sheets

(56) References Cited

FOREIGN PATENT DOCUMENTS

| | | | | |
|---|---|---|---|---|
| JP | 2011-137679 A | | 7/2011 | |
| JP | 2014178214 A | * | 9/2014 | ............. G01N 25/00 |
| JP | 2015-227821 A | | 12/2015 | |

* cited by examiner

GAS SENSOR DEVICE

TECHNICAL FIELD

The present invention relates to a gas sensor device including a detection heater that detects physical quantity of gas.

BACKGROUND ART

There is a known sensor device that uses heat for performing physical quantity detection and conversion to an electric signal. For example, a sensor device that measures physical quantity such as flow rate of a gas and concentration detects a change in a heat radiation amount from a heating element formed in a sensor element to the gas. In addition, a combustible gas concentration sensor includes: a catalyst layer that generates heat by contact with a combustible gas; and a heating element that heats the catalyst layer to allow reaction with the combustible gas. Such a sensor device needs to maintain constant detection sensitivity to a change in the physical quantity of gas for a long period. Accordingly, it is important to control the sensor device to maintain the heating element constantly at a predetermined temperature. A method of controlling the temperature of the heating element uses a resistance value change according to the temperature of the heating element and performs feedback control so that the heating element has a resistance value at a target temperature.

The heating element, however, is heated to a high temperature of several hundred degrees, and a long time use of this changes the relationship between the resistance value of the heating element and the temperature, causing a drift in the temperature control of the heating element. This might result in a change in the detection sensitivity to the change in the physical quantity of the gas, causing an error in the sensor device.

There is a conventional technology of a sensor device that monitors a temporal change of such a heating element (member constituting a heat generator) to ensure high reliability as disclosed as a combustible gas sensor in JP 2007-315925 A (PTL 1). The combustible gas sensor of PTL 1 includes, as a thermoelectric conversion means, a detecting portion including an oxidation catalyst layer for promoting oxidation reaction of a detection target gas, a first resistive layer that heats the detecting portion to a predetermined temperature by Joule heat, and a second resistive layer formed at a position not subject to thermal influence of the first resistive layer, individually provided in two thin portions formed by two independent recesses on a substrate, and the sensor comes in contact with the detection target gas and generates an electrical signal (refer to its summary). Specifically, this combustible gas sensor measures an ambient temperature from the resistance value of the second resistive layer, and detects degradation of the heating element from the relationship between the measured ambient temperature and the current and voltage applied to the first resistive layer (paragraphs 0029 and 0030).

CITATION LIST

Patent Literature

PTL 1: JP 2007-315925 A

SUMMARY OF INVENTION

Technical Problem

A sensor device that measures physical quantity of gas such as air flow rate and humidity in an intake passage of an internal combustion engine is installed in an environment having a wide temperature range due to changes in running environment and engine heating, and thus, the sensor device needs to satisfy sensor performance in a range of −40° C. to +125° C. Accordingly, even in the case of detecting the degradation of the heating element provided in the sensor device, it is also required to detect the degree of degradation with high accuracy under the environment having a wide range of temperature fluctuation.

In addition, the sensor device is subjected to a complicated temperature change due to an abrupt change in the ambient temperature, a fluctuation in the airflow, and a local temperature change such as heat generation in a drive circuit within the device. Degradation of the heating element needs to be detected with high accuracy even under such a temperature environment.

In order to detect degradation of the first resistive layer in the combustible gas sensor of PTL 1, the temperature of the first resistive layer and the temperature of the second resistive layer need to match each other every time the diagnosis is performed. However, the first resistive layer and the second resistive layer are located away from each other. In addition, peripheral members at installation peripheral portions of the first resistive layer and the second resistive layer have various structures and shapes, leading to a difference between the heat capacity of the installation portion of the first resistive layer and the heat capacity of the installation portion of the second resistive layer. Furthermore, the first resistive layer and the second resistive layer are disposed in different locations, leading to an occurrence of a difference in conduction paths of heat generated in the drive circuit provided in the combustible gas sensor. Therefore, an abrupt change in the ambient temperature would cause a temperature difference between the first resistive layer and the second resistive layer. In order to settle the temperature difference caused by the above-described situation in the combustible gas sensor of PTL 1, it is necessary to hold the first resistive layer and the second resistive layer in a constant temperature environment for a long time.

Using a gas sensor device that needs to be held in a constant temperature environment for a long time as described above under a temperature environment susceptible to a complicated and wide range of change like an internal combustion engine might fail in obtaining sufficient accuracy in detecting degradation of the heating element.

An object of the present invention is to provide a gas sensor device capable of detecting a temporal change with high accuracy and maintaining measurement accuracy over a long period under a temperature environment susceptible to a complicated and wide range of change.

Solution to Problem

In order to achieve the above object, a sensor device of the present invention is a gas sensor device including:
a heat insulating film formed on a substrate; a first heater provided on the heat insulating film and configured to measure physical quantity of gas; and a reference resistor formed in a resistive layer same as the first heater and formed on the heat insulating film, and gas sensor device further including a second heater that simultaneously heats the first heater and the reference resistor.

Advantageous Effects of Invention

According to the present invention, it is possible to provide a highly reliable gas sensor device capable of detecting a temporal change with high accuracy under various temperature environments and maintaining high-accuracy detection over a long period. Problems, configurations, and effects other than in the above will become apparent by the following description in the embodiments as follows.

DESCRIPTION OF EMBODIMENTS

Exemplary embodiments described below are application of the present invention to a sensor device that measures intake humidity of an automobile engine, as an example of a gas sensor device 100 (refer to FIG. 4). The physical quantity (environmental parameter) as a detection target of the gas sensor device 100 of the present exemplary embodiment is a change in gas concentration, and the device can also be used for measuring hydrogen concentration, for example, in addition to humidity.

The intake humidity as a measurement target of the gas sensor device 100 of the present exemplary embodiment is measured by detecting a change in the thermal conductivity of gas corresponding to the concentration of the gas. The change in the thermal conductivity is detected from a change in the heat radiation amount of the heater (heating element) within the sensor element. Since the change in the thermal conductivity of a gas corresponding to the concentration of the gas is minute, it is required to detect a change in the heat radiation amount of the heater and detect a temporal change in the resistance of the heater with high accuracy. Accordingly, it is possible to obtain high effects by using the configuration of the present invention in such a sensor device.

First Exemplary Embodiment

Figure 1:
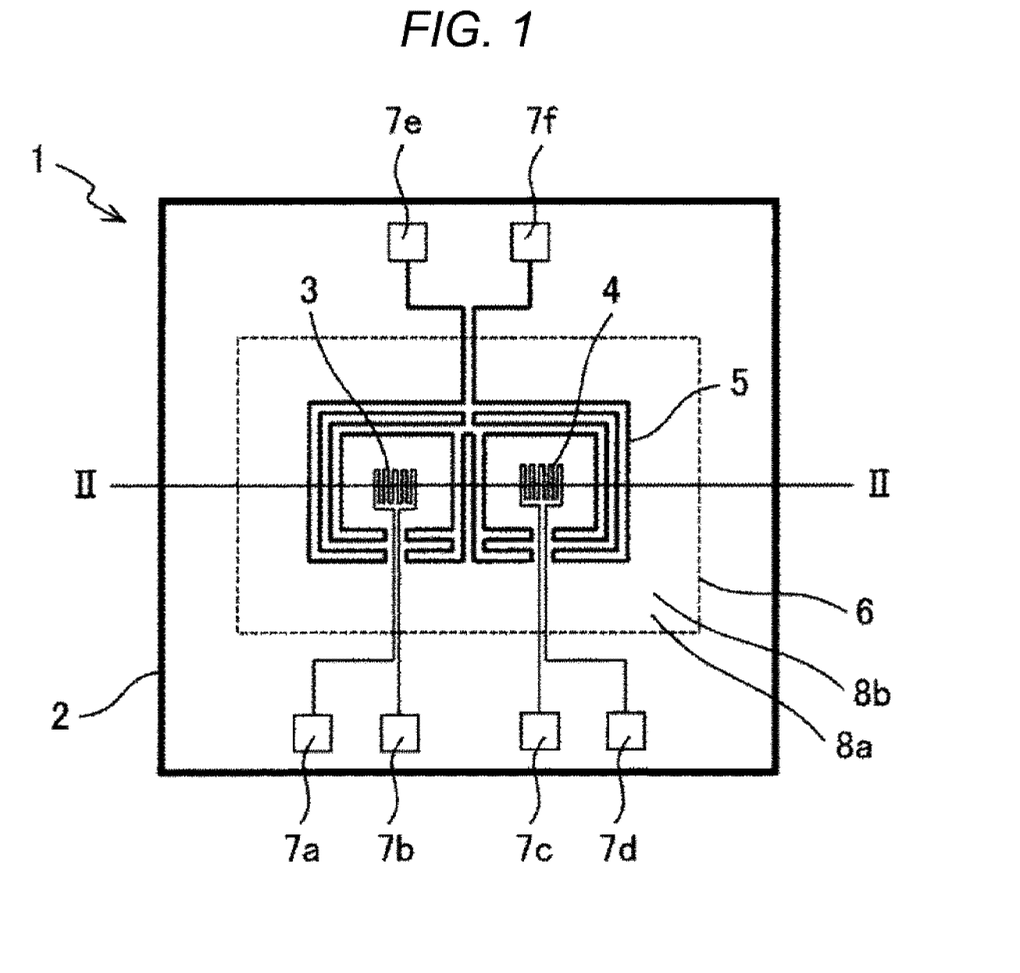
FIG. 1 is a plan view of a sensor element in a first exemplary embodiment.

FIG. 1 is a plan view of a sensor element 1 of the gas sensor device 100 according to the present exemplary embodiment.

The sensor element 1 is formed by using semiconductor microfabrication technology or etching technology utilizing photolithography. The sensor element 1 includes a substrate 2 formed of monocrystalline silicon. The substrate 2 has a cavity 6. The cavity 6 is covered with membrane supports 8a and 8b. The membrane supports 8a and 8b are film-like members formed of electrically insulating material and sometimes referred to as insulating films (electrical insulating films). On the membrane supports 8a and 8b, a detection heater 3, a reference resistor 4, and a calibration heater 5 are mounted. The detection heater 3, the reference resistor 4, and the calibration heater 5 extend along a plane of the membrane supports 8a and 8b, so as to be formed as a resistance pattern having a plurality of folds.

The detection heater 3 is used in detection of humidity. In the case of the present exemplary embodiment, the detection heater 3 is controlled to a constant temperature of about 500° C. for example. A change in the humidity also changes the amount of heat transfer from the detection heater 3 to the air, leading to a change in the power necessary for maintaining the detection heater 3 at 500° C. Measuring this change in the power enables humidity detection.

Examples of material stable at high temperature (material having a high melting point) to be selected for the detection heater 3 include: platinum (Pt), tantalum (Ta), molybdenum (Mo), or silicon (Si).

The reference resistor 4 is influenced by the heat generated by the detection heater 3. However, the reference resistor 4 is arranged at a location in a temperature environment lower than the temperature of the detection heater 3 and at which there is substantially no resistance degradation due to heat. The reference resistor 4 is formed of the same material as that of the detection heater 3. Additionally, the reference resistor 4 is arranged so as to have the same line width and the same shape as the detection heater 3. This enables thermal, mechanical and electrical properties to match between the detection heater 3 and the reference resistor 4, making it possible to improve measurement stability at the time of diagnosis.

The calibration heater 5 is arranged so as to surround the detection heater 3 and the reference resistor 4. The calibration heater 5 can be formed of the same material as the detection heater 3 and the reference resistor 4. Preferably, the calibration heater 5 is formed of a metal material so as to improve thermal conductivity and temperature uniformity.

The detection heater 3 is connected to electrode pads 7a and 7b formed on the substrate 2 for connection with the drive circuit. The reference resistor 4 is connected to electrode pads 7c and 7d, while the calibration heater 5 is connected to electrode pad 7e and 7f. An example to be selected as the material of the electrode pads 7a, 7b, 7c, 7d, 7e, and 7f is aluminum (Al).

The detection heater 3 and the calibration heater 5 are configured as heat generating heaters, and thus, the detection heater 3 will be referred to as a first heater and the calibration heater 5 as a second heater, in some cases. Moreover, each of the detection heater 3, the reference resistor 4 and the calibration heater 5 includes a resistor, and therefore, the detection heater 3, the reference resistor and the calibration heater 5 will be respectively referred to as a first resistor, a second resistor, and a third resistor, in some cases.

Figure 2:
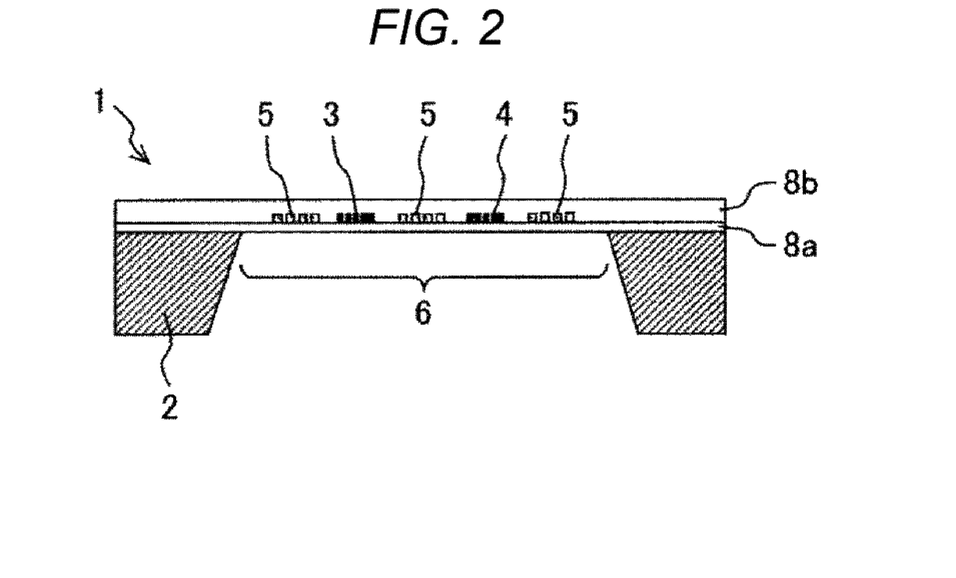
FIG. 2 is a cross-sectional view of the sensor element in the first exemplary embodiment.

FIG. 2 is a cross-sectional structure taken along line II-II illustrated in FIG. 1.

The sensor element 1 includes the substrate 2 formed of monocrystalline silicon. The sensor element 1 has the cavity 6 formed by etching the substrate 2. The cavity 6 is formed by processing the monocrystalline silicon substrate 2 using anisotropic etching, isotropic etching, or the like.

The membrane supports 8a and 8b are stacked on the upper surface of the substrate 2 and cover the cavity 6. The membrane supports 8a and 8b are members having electrical insulation and thermal insulation. The membrane supports 8a and 8b use a material of a single layer or stacked layers of silicon oxide (SiO2) and silicon nitride (Si3N4). The membrane supports 8a and 8b can also select a single layer or stacked layers of a resin material such as polyimide or ceramics or glass. The detection heater 3, the reference resistor 4, and the calibration heater 5 are interposed between the membrane support 8a and the membrane support 8b.

Figure 3:
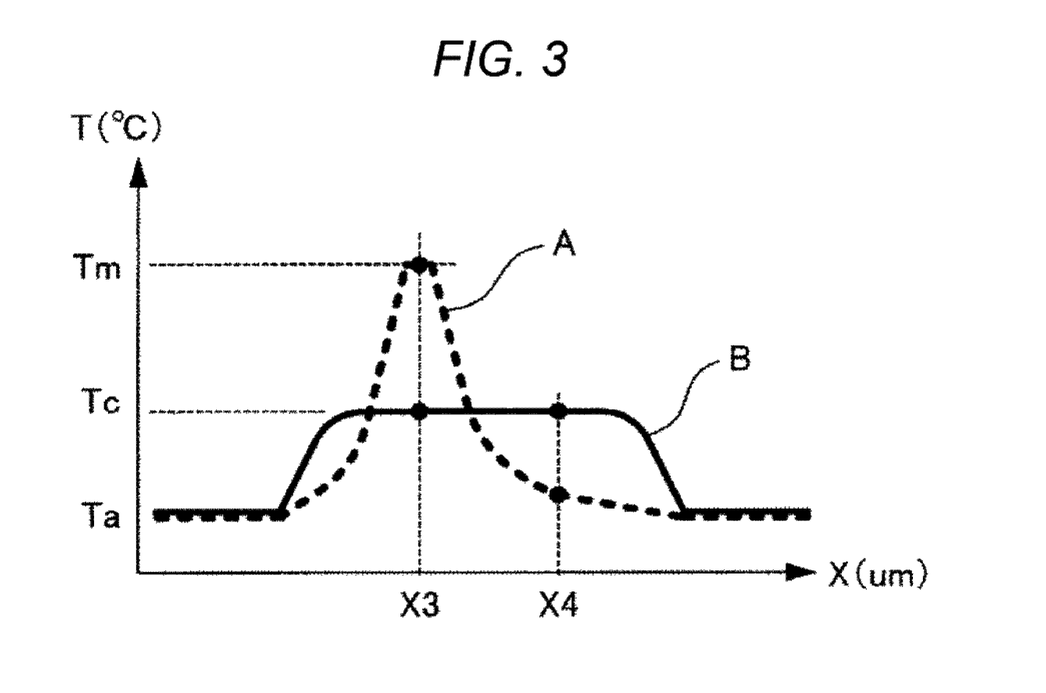
FIG. 3 is a diagram illustrating a temperature distribution of a sensor element in the first exemplary embodiment.

FIG. 3 illustrates a temperature distribution along II-II line of the sensor element 1 illustrated in FIG. 1.

At the time of humidity measurement, a position X3 at which the detection heater 3 exists is heated to a measurement temperature Tm as indicated by a broken line A in FIG. 3. The measurement temperature Tm is preferably 300° C. or more allowing a great change in the air thermal conductivity by the humidity change. The present exemplary embodiment illustrates an example of using a heating temperature of 500° C. The power to holding the detection heater 3 at the measurement temperature Tm changes in accordance with the amount of heat transfer to the air. Since the amount of heat transfer changes with the magnitude of the humidity, humidity can be measured by performing compensation for the ambient temperature onto the power of the detection heater 3.

In the gas sensor device 100 as described above, heating the detection heater 3 at a high temperature for a long period would change (degrade) the electrical property of the detection heater 3. That is, the relationship between the resistance value of the detection heater 3 and the temperature changes, causing a drift in the measurement temperature Tm. This results in changing the heating power of the detection heater 3 changes, causing an error in the measured value of the humidity.

Above-described diagnostic operation for achieving high-accuracy detection of a temporal change in the resistance value of the detection heater 3 will be described. As indicated by a solid line B in FIG. 3, heating of the detection heater 3 is stopped and the calibration heater 5 is heated at the time of diagnosis. With this operation, the detection heater 3 disposed at the position X3 in the drawing and the reference resistor 4 disposed at the position X4 in the drawing are held at a same diagnostic temperature Tc. Here, there is a possibility that the detection heater 3 and the reference resistor 4 have a diagnostically tolerable temperature difference (error). In this case, the temperature of the detection heater 3 and the temperature of the reference resistor 4 would be determined as a same in a case where the temperature of the detection heater 3 and the temperature of the reference resistor 4 have a difference as small as an error not affecting the diagnosis.

The calibration heater 5 is a heating means (heating member) that simultaneously heats the detection heater 3 and the reference resistor 4. Comparing the electrical property of the detection heater 3 and the electrical property of the reference resistor 4 at this time enables high-accuracy detection of the degradation of the detection heater 3. The temperature at the time of diagnosis is controlled to the same temperature Tc by the calibration heater 5 even in a case where the ambient temperature Ta fluctuates. This makes it possible to perform high-accuracy detection of the degree of degradation of the detection heater 3 under the same temperature environment every time the diagnosis is performed. That is, it is possible to eliminate the temperature property of the resistance value of the detection heater 3 and the reference resistor 4.

The diagnostic temperature Tc is preferably 100° C. or higher at which water droplets or the like can be removed. For example, in a case where dew condensation occurs on the membrane support on the cavity 6 of the sensor element 1 at the time of activation of the sensor device with partial adhesion of water droplets, temperature rise in the water droplet adhesion portion would be hindered even when the calibration heater 5 is driven. This results in occurrence of variation in the temperature of the detection heater 3 and the temperature of the reference resistor 4, making it difficult to make a satisfactory diagnosis. Therefore, the calibration heater 5 is heated to the water boiling point or above, making it possible to evaporate adhered water at an early stage, leading to prevention of erroneous diagnosis, improvement in diagnostic accuracy, and reduction in diagnosis time.

Note that it is preferable that the temperature Tc of the calibration heater 5 be higher than the maximum temperature of the ambient temperature Ta at which the gas sensor device 100 is used. The calibration heater 5 is a resistor, and thus its temperature can be controlled by controlling the heating current. Accordingly, when the ambient temperature Ta exceeds the diagnostic temperature Tc, temperature control becomes difficult, leading to a failure in making satisfactory diagnosis. For example, in a case where the gas sensor device 100 is used in an automobile environment, it is preferable to set the calibration heater 5 to a temperature higher than 125° C. being the maximum temperature of the use ambient temperature. This makes it possible to maintain the temperature of the detection heater 3 and the temperature of the reference resistor 4 constant under any temperature environment, enabling high-accuracy diagnosis.

More preferably, the diagnostic temperature Tc can be set to 200° C. or higher so as to obtain an effect of removing oily substance such as oil as well as water droplets. In this case, activating the calibration heater 5 can remove oily substance and this leads to prevention of erroneous diagnosis and improvement of the accuracy in comparison and diagnosis.

The upper limit of the diagnostic temperature Tc is preferably set to be lower than the measurement temperature Tm of the detection heater 3 and preferably set to a temperature that would generate a difference between the degradation progress speed of the reference resistor 4 and the degradation progress speed of the detection heater 3. For example, in the case of a metal material having a high melting point, the degradation progress of resistor becomes prominent at 300° C. or higher. Therefore, the diagnostic temperature Tc is preferably set to 300° C. or less (more preferably less than 300° C.) so as to be able to prevent degradation of the reference resistor 4 and detect degradation of the detection heater 3 satisfactorily. Furthermore, degradation of a resistor becomes prominent at 200° C. or higher in case of a semiconductor material. Accordingly, setting the diagnostic temperature Tc to 200° C. or less (more preferably less than 200° C.) would enable satisfactory detection of degradation of the detection heater 3.

Furthermore, it is preferable that the calibration heater 5 has a shape surrounding the detection heater 3 and surrounding the reference resistor 4. In this case, the calibration heater 5 is preferably arranged so as to partition a region where the detection heater 3 is disposed from a region where the reference resistor 4 is disposed. This arrangement can further uniformize the temperature distribution inside the calibration heater 5, making it possible to heat the detection heater 3 and the reference resistor 4 to the same temperature.

Figure 4:
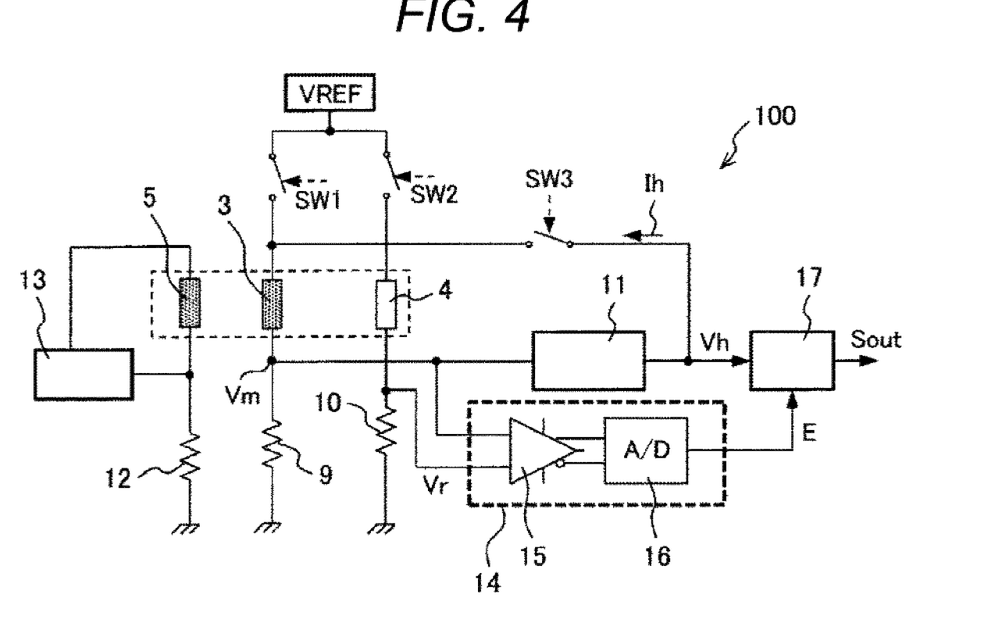
FIG. 4 is a circuit diagram illustrating a gas sensor device (including a drive circuit) in the first exemplary embodiment.

FIG. 4 illustrates an exemplary embodiment of the gas sensor device 100 (including a drive circuit) in the present exemplary embodiment.

Hereinafter, a configuration and operation at the time of humidity measurement will be described.

At the time of humidity measurement, a switch SW1 is turned off and a switch SW3 is turned on. In a series circuit including the detection heater 3, the resistor 9, and the switch SW1, an intermediate voltage Vm between the detection heater 3 and the resistor 9 is transmitted to a control circuit 11. The control circuit 11 is a circuit that controls the temperature Tm of the detection heater 3 and outputs a heating voltage Vh according to the input intermediate voltage Vm. The heating voltage Vh is fed back to the detection heater 3 via the switch SW3, allowing a heating current Ih to flow through the detection heater 3. The resistance value of the detection heater 3 varies with temperature. Accordingly, the intermediate voltage Vm is a signal that depends on the temperature of the detection heater. Controlling the intermediate voltage Vm to be a predetermined voltage enables the detection heater 3 to be controlled to a constant temperature. When the heat radiation amount of the detection heater 3 increases or decreases by a change in humidity, the heating voltage Vh fluctuates. Therefore, detecting the change in the heating voltage Vh makes it possible to measure the humidity.

Next, operation of the detection heater 3 at the time of degradation diagnosis will be described.

At the time of degradation diagnosis, SW1 and SW2 are turned on. SW3 is turned off, and the heating current from the control circuit 11 to the detection heater 3 is stopped. Next, a control circuit 13 that controls the temperature Tc of the calibration heater 5 is driven, and thus, the calibration heater 5 is controlled to be a constant temperature, namely, the temperature Tc. A resistor 10 is connected in series to the reference resistor 4. Setting the SW1 and the SW2 to a conductive state would form a bridge circuit (3, 4, 9, and 10) including the detection heater 3, the resistor 9, the reference resistor 4, and the resistor 10.

A reference voltage VREF is applied to the bridge circuit (3, 4, 9, and 10). The detection heater 3 and the reference resistor 4 are arranged on the VREF side in the bridge circuit (3, 4, 9, and 10). The resistor 9 and the resistor 10 are arranged on the reference voltage (GND) side opposite to VREF side in the bridge circuit (3, 4, 9, and 10).

The intermediate voltage Vm between the detection heater 3 and the resistor 9 and an intermediate voltage Vr between the reference resistor 4 and the resistor 10 are transmitted to a comparison circuit 14. The comparison circuit 14 includes: a differential amplifier 15 that detects and amplifies a difference between the intermediate voltage Vm and the intermediate voltage Vr; and an analog-to-digital converter 16 that converts an amplified signal into a digital value. This digital value serves as a diagnostic signal E that changes in accordance with a difference between the resistance value of the detection heater 3 and the resistance value of the reference resistor 4. Therefore, the diagnostic signal E is a signal that changes in accordance with the degree of degradation of the detection heater 3.

The diagnostic signal E is transmitted to a correction circuit 17. The correction circuit 17 stores a digital value corresponding to the diagnostic signal E, corrects the detected Vh at the time of humidity measurement, and outputs the corrected signal as a humidity measurement signal Sout.

The resistor 9 and the resistor 10 are preferably resistors formed of a same material and having a small temperature coefficient of resistance. More preferably, the resistor 9 and the resistor 10 are manufactured by patterning a same resistive film manufactured by a semiconductor process. This enables, in a bridge circuit configuration as illustrated in the present exemplary embodiment, the resistance temperature change between the resistor 9 and the resistor 10 is minute and canceled out, leading to improvement of accuracy of detecting the degradation of the detection heater 3.

The switches SW1, SW2, and SW3 can be formed by semiconductor switches using MOS transistors or the like. This enables the switches to perform high-speed electrical switching and to be formed as a one-chip LSI together with the control circuits 11, 12, the comparison circuit 14, and the correction circuit 17, thereby achieving miniaturization.

Regarding the above-described switching between the humidity measurement mode and the diagnosis mode, the diagnostic mode can be activated when the power supply for the gas sensor device 100 is turned on. That is, during the period from the turn-on of the power supply of the gas sensor device 100 to the start of the measurement of the physical quantity of the gas, the calibration heater 5 is driven to diagnose the detection heater 3. Together with removal of water droplets and contaminants on the sensor element 1 by the calibration heater 5, the degradation amount of the detection heater 3 can be diagnosed and the correction amount can be updated. Thereafter, humidity measurement is possible in a state where contaminants of the sensor element 1 have been removed, enabling humidity measurement with higher accuracy.

Additionally, it is possible to switch to the diagnosis mode at a predetermined cycle even after the power supply is turned on. This enables periodic diagnosis and correction even in an environment that is more likely to promote degradation. In addition, the temperature of the detection heater 3 can be raised in accordance with the measurement gas so as to improve the sensitivity. Raising the temperature of the detection heater 3, however, would highlight the degradation of the detection heater 3. Accordingly, it is preferable to periodically diagnose the detection heater 3 and update the correction amount so as to reduce the measurement error accompanying the degradation.

Furthermore, the diagnosis mode can be activated by a command from the outside of the gas sensor device 100. For example, the gas sensor device 100 receives an electric signal from a host device such as an engine control unit (ECU) and then, diagnoses and corrects the detection heater 5. This makes it possible to diagnose the detection heater in a stable environment suitable for diagnosis and correction of the gas sensor device 100, such as during stoppage or idling state of the engine, and this leads to further improvement of the diagnostic accuracy.

It is also possible to output a signal corresponding to a diagnosis result to the outside of the gas sensor device 100, enabling the host device to correct the measurement signal obtained from the gas sensor device 100.

An example of an applicable method of correcting the error caused by degradation of the detection heater 3 is a technique of using the correction circuit 17 to add an offset in accordance with the diagnostic signal E to the detection signal (Vh) from the sensor element 1. Furthermore, it is possible to use a method of altering a control parameter of the control circuit 11 in accordance with the diagnostic signal E.

Second Exemplary Embodiment

A second exemplary embodiment of the present invention will be described. The present exemplary embodiment will be described focusing on a difference from the first exemplary embodiment, and the configuration that omits description is similar to the configuration of the first exemplary embodiment. Same reference numerals are given to the same configurations as those of the first exemplary embodiment, and the description of similar parts is omitted.

In the present exemplary embodiment, the gas sensor device 100 of the first exemplary embodiment further includes a configuration capable of reducing an influence of contamination.

For example, in a case where the gas sensor device 100 in the first exemplary embodiment is used for the purpose of measuring the intake humidity of an automobile engine, the sensor element 1 might be contaminated by arrival of oil vapor or the like during use. Moreover, in the sensor element 1, the detection heater 3 is heated to a high temperature and therefore induces little amount of adhesion of oil. In contrast, the reference resistor 4 has a low temperature, and thus, is likely to induce adhesion of oil. As a result, the heat capacity and the thermal conductivity of the thin film portion vary depending on the difference in the amount of oil adhesion. Nonuniform contamination of the sensor element 1 leads to a temperature difference occurring between the detection heater 3 and the reference resistor 4 when the calibration heater 5 is driven. The difference between the resistance value of the detection heater 3 and the resistance value of the reference resistor 4 caused by this temperature difference would lead to an error at the time of diagnosis, causing degradation of diagnostic accuracy.

In the present exemplary embodiment, the calibration heater 5 is to be driven even during diagnosis in order to solve the above-described problem. Preferably, the calibration heater 5 is constantly driven while the power supply for the gas sensor device 100 is turned on, so as to further enhance the effects. This configuration enables the reference resistor 4 to be maintained at a temperature higher than the ambient temperature, making it possible to reduce adhesion of contaminants. Preferably, heating the calibration heater 5 to 200° C. or higher would be able to suppress adhesion of oily substance such as oil besides water droplets, leading to improvement of diagnostic accuracy. In addition, this would eliminate a standby time until the contaminants are removed, making it possible to reduce the diagnosis time. In addition, there is no need to wait for the temperature rise of the calibration heater 5 at the time of diagnosis, enabling the diagnosis to be performed in a shorter time.

Figure 5:
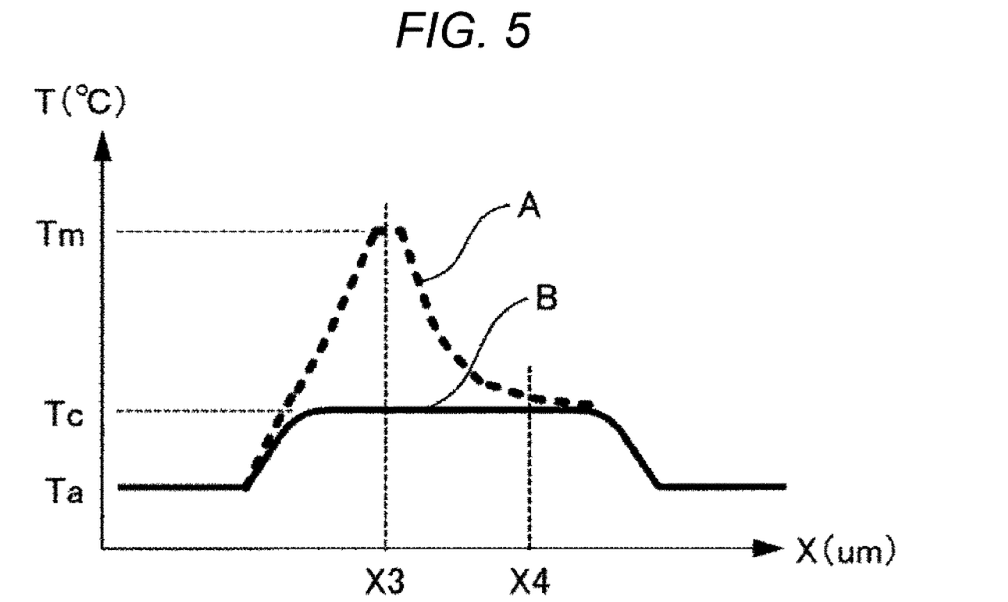
FIG. 5 is a diagram illustrating temperature distribution of a sensor element according to a second exemplary embodiment.

FIG. 5 illustrates a temperature distribution of the sensor element 1 in this exemplary embodiment.

At the time of humidity measurement, the position X3 at which the detection heater 3 exists has the measurement temperature Tm, while a periphery including the position X4 where the reference resistor 4 is disposed has the temperature Tc of the calibration heater 5, as illustrated in a broken line A of FIG. 5. The measurement temperature Tm is preferably 300° C. or higher, and the exemplary embodiment indicates an exemplary case where the heating temperature is 500° C. The temperature Tc of the calibration heater 5 is set to a range lower than the detection heater 3 and in which degradation of the reference resistor 4 is small, for example, the temperature Tc can be set to 200° C. to 300° C.

Even if the periphery of the detection heater 3 is heated to the temperature Tc as described above, the heat radiation amount of the detection heater 3 varies depending on the humidity. Accordingly, the humidity can be measured by detecting the power of the detection heater 3. Since the temperature at the periphery of the detection heater 3 can be maintained at a constant level, it is possible to reduce the change in the heat radiation amount of the detection heater 3 due to the ambient temperature Ta.

Next, diagnostic operation for achieving high-accuracy detection of degradation of the resistance value of the detection heater 3 will be described. As illustrated by the solid line B in FIG. 5, similarly to the first exemplary embodiment at the time of diagnosis, stopping the heating of the detection heater 3 can maintain the detection heater 3 arranged at the position X3 in the drawing and the reference resistor 4 arranged at the position X4 are held at the same diagnostic temperature Tc, as in the first exemplary embodiment. Comparing the electrical property of the detection heater 3 and the electrical property of the reference resistor 4 at this time enables high-accuracy detection of the degradation of the detection heater 3. The temperature is controlled to the same temperature by the calibration heater 5 every time the diagnosis is performed even in a case where the ambient temperature Ta fluctuates, making it possible to perform high-accuracy detection of the degree of degradation of the detection heater 3.

Third Exemplary Embodiment

A third exemplary embodiment of the present invention will be described. The present exemplary embodiment will be described focusing on a difference from the first and second exemplary embodiments, and the configuration that omits description is similar to the configuration of the first exemplary embodiment. Same reference numerals are given to the same configurations as those of the first and second exemplary embodiments, and the description of similar parts is omitted.

Figure 6:
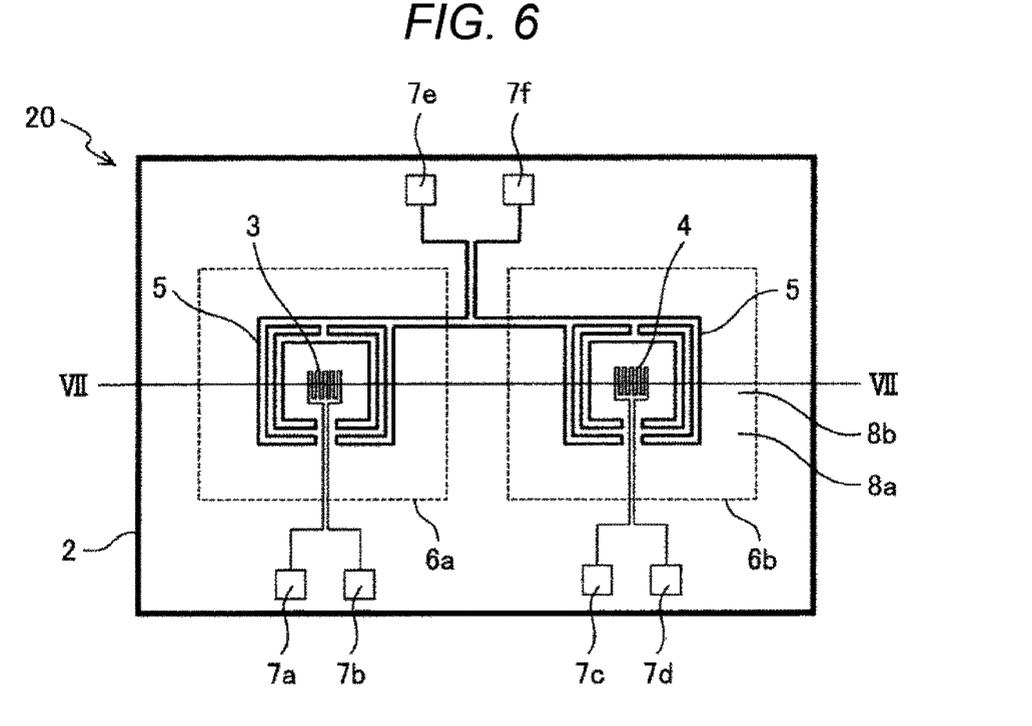
FIG. 6 is a plan view of a sensor element according to a third exemplary embodiment.

FIG. 6 is a plan view of a sensor element 20 in the present exemplary embodiment.

The sensor element 20 includes the substrate 2 formed of monocrystalline silicon. The substrate 2 has cavity 6a and a cavity 6b. The cavities 6a and 6b are covered with membrane supports 8a and 8b. The detection heater 3 and the calibration heater 5 are mounted on the membrane supports 8a and 8b on the cavity 6a. In the cavity 6b, a reference resistor 4 and a calibration heater 5 are mounted. The detection heater 3, the reference resistor 4, and the calibration heater 5 extend along a plane of the membrane supports 8a and 8b, so as to be formed as a resistance pattern having a plurality of folds. The calibration heater 5 formed in the cavity 6a and the calibration heater 5 formed in the cavity 6b are formed of the same material, as one resistance pattern.

The calibration heater 5 is mounted so as to be disposed across the two cavities 6a and 6b and to surround the detection heater 3 in the cavity 6a, while surrounding the reference resistor 4 in the cavity 6b. That is, the calibration heater 5 is arranged so as to partition the region where the detection heater 3 is disposed and the region where the reference resistor 4 is disposed. The calibration heater 5 can be formed of the same material as the detection heater 3 and the reference resistor 4.

The detection heater 3 is connected to electrode pads 7a and 7b formed on the substrate 2 for connection with the drive circuit. The reference resistor 4 is connected to electrode pads 7c and 7d, while the calibration heater 5 is connected to electrode pad 7e and 7f. Note that the drive circuit is configured similarly to the case of FIG. 4 described in the first exemplary embodiment.

Figure 7:
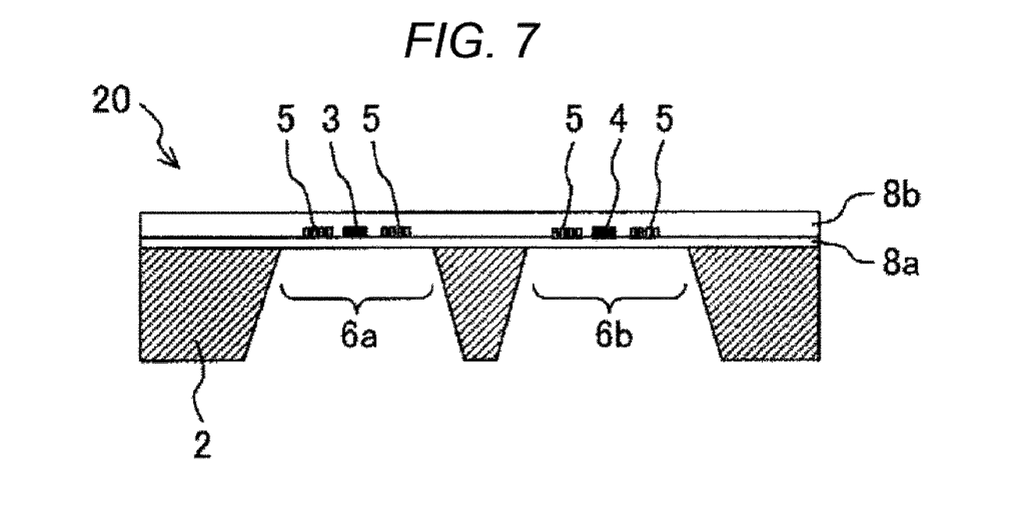
FIG. 7 is a cross-sectional view of the sensor element according to the third exemplary embodiment.

FIG. 7 is a view illustrating a cross-sectional structure along line VII-VII illustrated in FIG. 6.

The sensor element 20 includes the substrate 2 formed of monocrystalline silicon. The substrate 2 has a cavity 6a and a cavity 6b. The cavities 6a and 6b are formed by simultaneously processing the monocrystalline silicon substrate 2 using anisotropic etching, isotropic etching, or the like.

The membrane supports 8a and 8b are stacked on the upper surface of the substrate 2 and cover the cavities 6a and 6b. The detection heater 3, the reference resistor 4, and the calibration heater 5 are provided between the membrane support 8a and the membrane support 8b. That is, the detection heater 3, the reference resistor 4, and the calibration heater 5 are sandwiched between the membrane support 8a and the membrane support 8b.

Figure 8:
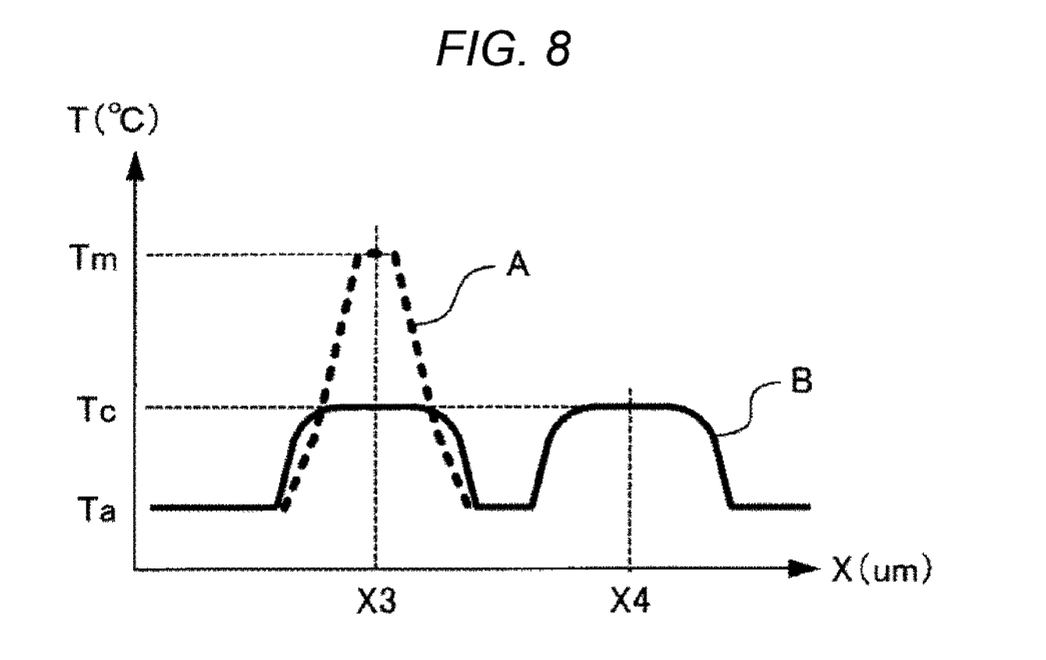
FIG. 8 is a diagram illustrating a temperature distribution of the sensor element according to the third exemplary embodiment.

FIG. 8 illustrates temperature distribution along the X-ray of the sensor element 20 of FIG. 6.

At the time of humidity measurement, the position X3 at which the detection heater 3 exists has a measurement temperature Tm as indicated by a broken line A in FIG. 8. The measurement temperature Tm is preferably 300° C. or higher, and the exemplary embodiment indicates an exemplary case where the heating temperature is 500° C. The power for holding the detection heater 3 at the measurement temperature Tm varies depending on the heat radiation amount to the air. Since the heat radiation amount varies with humidity, humidity can be measured by compensating the ambient temperature using the calibration heater 5 for calibration onto the power of the detection heater 3.

Diagnostic operation for detecting degradation of a resistance value of the detection heater 3 will be described. As illustrated by the solid line B in FIG. 8, when the heating current of the detection heater 3 is stopped and the calibration heater 5 is heated at the time of diagnosis, the detection heater 3 arranged at the position X3 in the drawing and the reference resistor 4 arranged at the position X4 are simultaneously heated and held at the same diagnostic temperature Tc as in the first exemplary embodiment. Comparing the electrical property of the detection heater 3 and the electrical property of the reference resistor 4 at this time enables high-accuracy detection of the degradation of the detection heater 3. The temperature is controlled to the same temperature by the calibration heater 5 every time the diagnosis is performed even in a case where the ambient temperature Ta fluctuates, making it possible to perform high-accuracy detection of the degree of degradation of the detection heater 3. In other words, it is possible to eliminate the temperature dependence of the electrical property of the detection heater 3 and the temperature dependence of the electrical property of the reference resistor 4.

The cavity 6a and the cavity 6b of the sensor element illustrated in the present exemplary embodiment desirably have the membrane support of the same size and the same structure. Additionally, the calibration heaters 5 individually formed in the cavity 6a and the cavity 6b are desirably formed of the same material. With this configuration, the heat capacity and the heat conduction would match between the detection heater 3 and the reference resistor 4, and achieves matching in the heat generation balance of the calibration heater 5 formed in the cavity 6a and the calibration heater 5 formed in the cavity 6b. Accordingly, it is possible to achieve satisfactory matching in the temperature of the detection heater 3 and the temperature of the reference resistor 4 in the diagnosis. This results in successful diagnosis of the degradation of the detection heater 3 with high accuracy.

Similarly to the second exemplary embodiment, the present exemplary embodiment can also provide a configuration of heating the calibration heater 5 at times other than diagnosis, preferably constantly heating the calibration heater 5. This can reduce contamination of the reference resistor 4 and can higher matching between the temperature of the detection heater 3 and the temperature of the reference resistor 4 at the time of diagnosis, making it possible to diagnose degradation of the detection heater 3 with high accuracy.

The present invention is not limited to the above-described individual exemplary embodiments, but may include various types of modification. For example, the above-described exemplary embodiments give detailed explanation just to allow the present invention to be clearly understood. Therefore, the present invention is not limited to the case having all of components in the configuration. In addition, a portion of configuration of an exemplary embodiment can be replaced with a portion of configuration of another exemplary embodiment. A portion or the configuration of another exemplary embodiment can be added to a certain exemplary embodiment. Moreover, regarding the portions of the configuration of each of the exemplary embodiments, addition, deletion, and replacement from another configuration would be possible.

REFERENCE SIGNS LIST 1 sensor element
2 substrate
3 detection heater
4 reference resistor
5 calibration heater
6 cavity
7a to 7f electrode pad
8a, 8b membrane support
9 resistor
10 resistor
11 control circuit
12 resistor
13 control circuit
14 comparison circuit
15 differential amplifier
16 analog-to-digital converter
17 correction circuit
20 sensor element
100 gas sensor device

The invention claimed is:

1. A gas sensor device comprising:
a heat insulating film formed on a substrate;
a first heater provided on the heat insulating film and configured to measure physical quantity of a gas; and
a reference resistor formed in a same resistive layer as the first heater and formed on the heat insulating film,
wherein the gas sensor device further comprises a second heater that simultaneously heats the first heater and the reference resistor,
wherein the second heater is formed in the same resistive layer as the reference resistor and the first heater,
wherein the second heater is configured to be used at the time of diagnosis of the first heater, and
wherein the first heater is configured such that driving of the first heater is stopped during operation of the second heater.

2. The gas sensor device according to claim 1, further comprising
a bridge circuit including the first heater and the reference resistor,
wherein the first heater is diagnosed on the basis of a differential voltage signal of the bridge circuit.

3. The gas sensor device according to claim 2,
wherein signal correction according to the physical quantity of the gas measured by using the first heater is performed on the basis of the differential voltage signal.

4. The gas sensor device according to claim 1,
wherein the second heater is driven and diagnosis of the first heater is performed during a period from a start of power supply to a start of measurement of the physical quantity of the gas.

5. The gas sensor device according to claim 1,
wherein diagnosis of the first heater is performed at a predetermined cycle by switching between measurement operation of measuring the physical quantity of the gas using the first heater and diagnostic operation using the second heater.

6. The gas sensor device according to claim 1,
wherein a signal corresponding to a diagnosis result of the first heater is output to an outside of the gas sensor device.

7. The gas sensor device according to claim 1,
wherein diagnosis of the first heater is performed by using the second heater in accordance with a signal from outside of the gas sensor device.

8. The gas sensor device according to claim 1,
wherein the temperature of the second heater is 125° C. or more.

9. The gas sensor device according to claim 1,
wherein the first heater and the reference resistor are formed of metallic material, and a temperature of the second heater that heats the first heater and the reference resistor is 300° C. or less.

10. The gas sensor device of claim 1, further comprising at least one cavity configured to accommodate therein at least the second heater and the reference resistor.

* * * * *